United States Patent
Park

(12)
(10) Patent No.: US 6,347,183 B1
(45) Date of Patent: *Feb. 12, 2002

(54) METHOD AND APPARATUS FOR REPRODUCING VIDEOGRAMS BASED ON PROGRAM RATINGS

(75) Inventor: Hyun-Jeong Park, Suwon (KR)

(73) Assignee: Samsung Electronics Co., Ltd., Suwon (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/144,348

(22) Filed: Aug. 31, 1998

(30) Foreign Application Priority Data

Aug. 29, 1997 (KR) ............................................. 97-42824

(51) Int. Cl.$^7$ .................................................. H04N 5/91
(52) U.S. Cl. ............................................. 386/94; 386/95
(58) Field of Search ............................. 386/46, 94, 95, 386/125, 126; 713/200; 380/202

(56) References Cited

U.S. PATENT DOCUMENTS

| | | | |
|---|---|---|---|
| 4,792,864 A | 12/1988 | Watanabe et al. | |
| 4,930,158 A | 5/1990 | Vogel | |
| 5,122,886 A | 6/1992 | Tanaka | |
| 5,214,556 A | 5/1993 | Kilbel | |
| 5,382,983 A | 1/1995 | Kwoh et al. | |
| 5,448,371 A | 9/1995 | Choi | |
| 5,485,518 A | 1/1996 | Hunter et al. | |
| 5,488,409 A | 1/1996 | Yuen et al. | |
| 5,550,575 A | 8/1996 | West et al. | |
| 5,583,576 A | 12/1996 | Perlman et al. | |
| 5,717,814 A | * 2/1998 | Abecassis | 386/46 |
| 5,751,335 A | 5/1998 | Shintani | |
| 5,937,158 A | * 8/1999 | Uranaka | 713/200 |

* cited by examiner

*Primary Examiner*—Huy Nguyen
(74) *Attorney, Agent, or Firm*—Robert E. Bushnell, Esq.

(57) ABSTRACT

A video record/playback apparatus for reproducing a video recording medium containing a videogram performs a playback operation of the video recording medium, based on comparison of a program rating corresponding to the videogram and a user rating code determined by a user. In this video record/playback apparatus, a key input unit is used for inputting at least one user rating code and a program rating code corresponding to the videogram. A recording/reproduction unit records the input program rating code on the video recording medium and reproduces the video recording medium. A rating code insertion/separation unit inserts the program rating code into the videogram to be recorded on the video recording medium and separates the program rating code from the video signal supplied from the recording/reproduction unit. A storage unit stores the input at least one user rating code. A controller compares the program rating code from the recording/reproduction unit with the stored at least one user rating code and controls the operation of the recording/reproduction unit to perform a playback operation of the video recording medium according to the comparison result.

5 Claims, 2 Drawing Sheets

METHOD AND APPARATUS FOR REPRODUCING VIDEOGRAMS BASED ON PROGRAM RATINGS

CLAIM OF PRIORITY

This application makes reference to, incorporates the same herein, and claims all benefits accruing under 35 U.S.C. §119 from an application for METHOD AND APPARATUS FOR REPRODUCING VIDEOGRAMS BASED ON PROGRAM RATINGS earlier filed in the Korean Industrial Property Office on the 29$^{th}$ of August 1997 and there duly assigned Ser. No. 42824/1997.

BACKGROUND OF THE INVENTION

1. Field of the Invention

The present invention relates to a method and apparatus for reproducing a videogram contained in a video recording medium based on a program rating of the videogram indicated on the video recording medium, and more particularly, relates to a video recording/reproducing apparatus for restricting playback of a video recording medium containing a videogram based on a program rating of the videogram indicated on the video recording medium.

2. Related Art

Equipment for recording and/or reproducing videograms such as movies or films have become widely spread and gradually popular, and video recording media has also been developed as video cassette tape, compact disc-ROM (CD-ROM) and digital versatile disc (DVD). As a result, videograms can be easily viewed through such video recording equipment and recording media. However, videograms recorded on such recording media range from programs for children to pornographic programs for adults and everything in between including extremely graphic horror films or extremely violent films. While program rating for videograms has been developed for viewing control of certain film to certain groups of people based on the contents of the videograms, there is still a need to restrict access of certain groups of people to certain classes of programs.

There are several viewing control techniques known to restrict access to unauthorized viewing. Most viewing control inventions are directed to television programs such as is disclosed in U.S. Pat. No. 5,382,983 for Apparatus And Method For Total Parent Control Of Television Use issued to Kwoh et al., U.S. Pat. No. 5,485,518 for Electronic Media program Recognition And Choice issued to Hunter et al., U.S. Pat. No. 5,550,575 for Viewer Discretion Television Program Control System issued to West et al., U.S. Pat. No. 5,583,576 for Rating-Dependent Parental Lock-Out For Television Reception issued to Perlman et al., and U.S. Pat. No. 5,751,335 for Viewing Restricting Method And Viewing Restricting Apparatus issued to Shintani. Other viewing control inventions are directed to video programs of video recording equipment such as is disclosed in U.S. Pat. No. 4,792,864 for Apparatus For Detecting Recorded Data In A Video Tape Recorder For Audience Rating Purposes issued to Watanabe et al., U.S. Pat. No. 4,930,158 for Selective Video Playing System issued to Vogel, U.S. Pat. No. 5,122,886 for Selective Information Playback From Recording Medium Based On User Input Contents Code issued to Tanaka, U.S. Pat. No. 5,214,556 for Video Cassette Recorder Protection System issued to Kilbel, and U.S. Pat. No. 5,448,371 for Video Recording/Reproducing Apparatus Capable Of Reading A Label Of Laser Disk issued to Choi and assigned to the same assignee of the instant application. Conventionally, many suppliers for manufacturing videograms gain approval of program ratings with respect to videograms from program rating authorities and label the program ratings on video recording media by means of color markings when the videograms are recorded on the video recording media. However, many video record/playback apparatuses can neither discriminate between program ratings assigned to videograms by means of a video recording medium containing videograms, nor discriminate between the ratings of users who operate the video recording medium.

SUMMARY OF THE INVENTION

Accordingly, it is an object of the present invention to improve control of videogram viewing.

It is also an object to provide an improvement in household control of unauthorized viewing of videograms.

It is further an object to provide a video record/playback apparatus for permitting a user to set a program rating code of a videogram and to record the videogram with the program rating code inserted therein for restricted use.

It is yet another object to provide a video record/playback apparatus for restricting playback of a video recording medium containing a videogram, by use of a user rating code input by a user and a program rating code of the videogram indicated on the video recording medium.

These and other objects of the present invention can be achieved by a method for restricting playback of a video recording medium containing a videogram. The playback restriction method may be practiced by (a) recording a program rating code indicating a program rating of a videogram determined based on the age of a user, (b) storing at least one user rating code corresponding to a user rating determined by a superintendent; (c) comparing the program rating code recorded on the video recording medium with the stored user rating code; and (d) performing a playback operation of the video recording medium according to the result of the comparison obtained by step (c).

According to one aspect of the present invention, a video record/playback apparatus for restricting playback of a video recording medium containing a videogram may use a key input unit for inputting at least one user rating code and a program rating code corresponding to the videogram; a recording/reproduction unit for recording the input program rating code on the video recording medium and reproducing the video recording medium; a rating code insertion/separation unit for inserting the program rating code into the videogram to be recorded on the video recording medium and separating the program rating code from the video signal supplied from the recording/reproduction unit; a storage unit for storing the input of at least one user rating code; and a controller for comparing the program rating code from the recording/reproduction unit with the stored user rating code and controlling the recording/reproduction unit to perform a playback operation of the video recording medium according to the result of the comparison.

According to yet another aspect of the present invention, a video record/playback apparatus for restricting playback of a video recording medium containing a videogram, may use a video recording medium on which a program rating code with respect to a contained videogram is indicated; a reader for reading the program rating code indicated on the video recording medium; a key input unit for inputting at least one user rating code; a reproduction unit for reproducing the video recording medium; a storage unit for storing the input of at least one user rating code; and a controller for comparing the program rating code from the reader with the user rating code stored in the storage unit and controlling the reproduction unit to perform a playback operation of the video recording medium according to the result of the comparison.

The present invention is more specifically described in the following paragraphs by reference to the drawings attached only by way of example.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
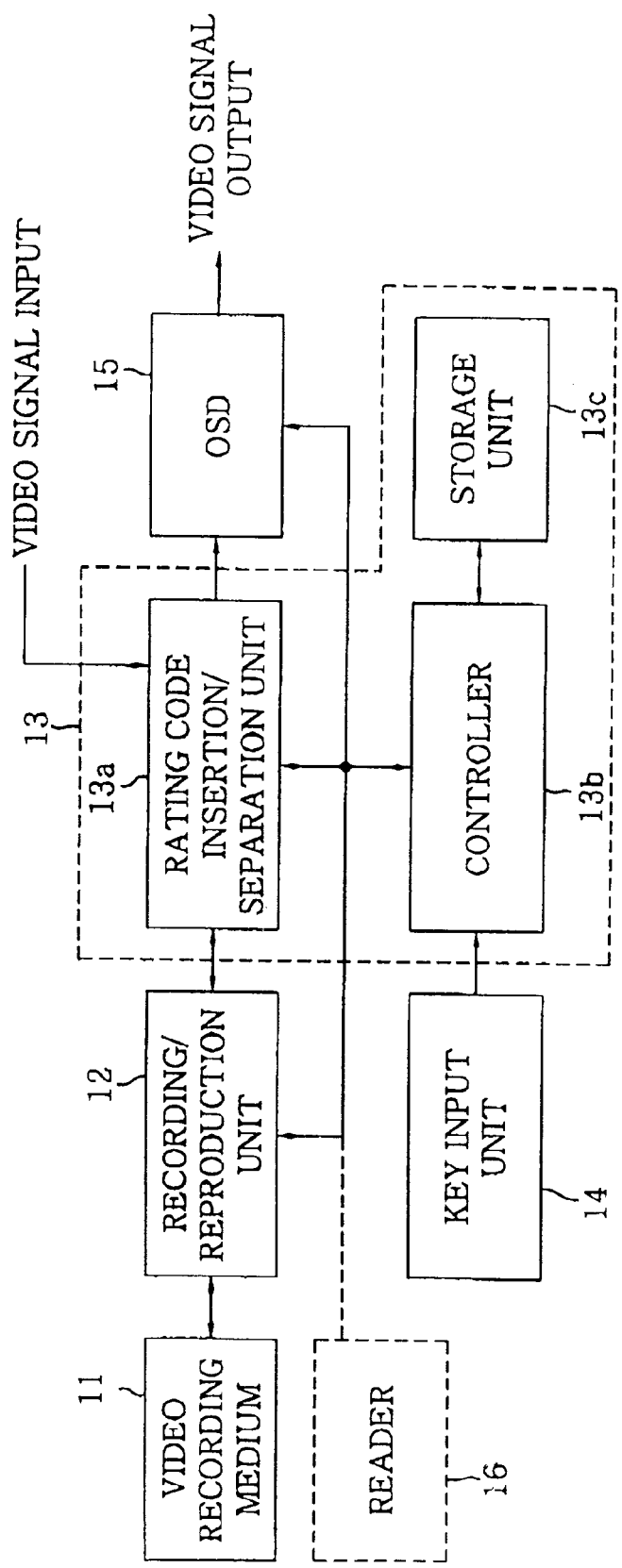
FIG. 1 is a block diagram of a video record/playback apparatus for reproducing a videogram based on a program rating of the videogram according to the principles of the present invention.

Referring now to the drawings and particularly to FIG. 1, which illustrates a video record/playback apparatus constructed according to the principles of the present invention. The video record/playback apparatus determines whether or not a playback operation of a video recording medium will be performed based on a program rating code recorded on a video recording medium and a user rating code input by a user. For clarity of explanation, a program rating is a general rating determined on basis such as age: adult, students for high-school, middle school and elementary school, and so on, and a user rating code determined by a superintendent who has authorities capable of determining a user rating code, such as parents. The program rating code is recorded on a video recording medium or recorded in a predetermined section of a video signal, by means of bar codes or color markings for indicating the program ratings. The video record/playback apparatus according to the present invention determines a program rating of a videogram recorded on a video recording medium based on the program rating code recorded on the video recording medium. Then, the playback restriction apparatus reproduces or does not reproduce the videogram from the video recording medium based on the comparison result of the program rating code determined and a user rating code input by a user. The user rating is determined by a superintendent and stored in a storage unit of the video record/playback apparatus according to the present invention. For playback of the video recording medium, the stored user rating is compared with a user rating of a current user who manipulates a playback operation of the video recording medium.

As shown in FIG. 1, the video record/playback apparatus for restricting playback of a video recording medium 11 containing a videogram based on a program rating of the videogram according to the present invention includes a recording/reproduction unit 12, a program rating discriminator 13, a key input unit 14, an on-screen display OSD 15, and a reader 16 optionally installed for reading a program rating code in a form of color markings from the video recording medium 11. The recording/reproduction unit 12 is used to record a video signal together with a program rating code on the video recording medium 11 during recording, and playback the video signal recorded on the video recording medium 11. The rating discriminator 13 is connected to the recording/reproduction unit 12 and includes a rating code insertion/separation unit 13a, a controller 13b and a storage unit 13c for determining a program rating code from the video signal. The rating code insertion/separation unit 13a inserts a program rating code into a video signal to be recorded on the video recording medium 11. Then, the rating code insertion/separation unit 13a supplies the resultant signal to the recording/reproduction unit 12, and separates the signal supplied from the recording(reproduction unit 12 into the video signal and the program rating code. The video signal is provided to the on-screen-display (OSD) 15 and the program rating code is input to the controller 13b. The controller 13b supplies the program rating code to be recorded on the video recording medium 11 to the rating code insertion/separation unit 13a and uses the program rating code supplied from the rating code insertion/separation unit 13a for determining the program rating with respect to the video recording medium 11. The storage unit 13c stores the user rating code corresponding to a user key input. A key input unit 14 connected to the rating discriminator 13 supplies the user rating code corresponding to the user key input to the controller 13b. The OSD 15 synthesizes the video signal output from the rating code insertion/separation unit 13a with the program rating code of the videogram, the user rating code and character signals of the user rating and outputs the resultant signal via a monitor (not shown) for a visual display.

Figure 2:
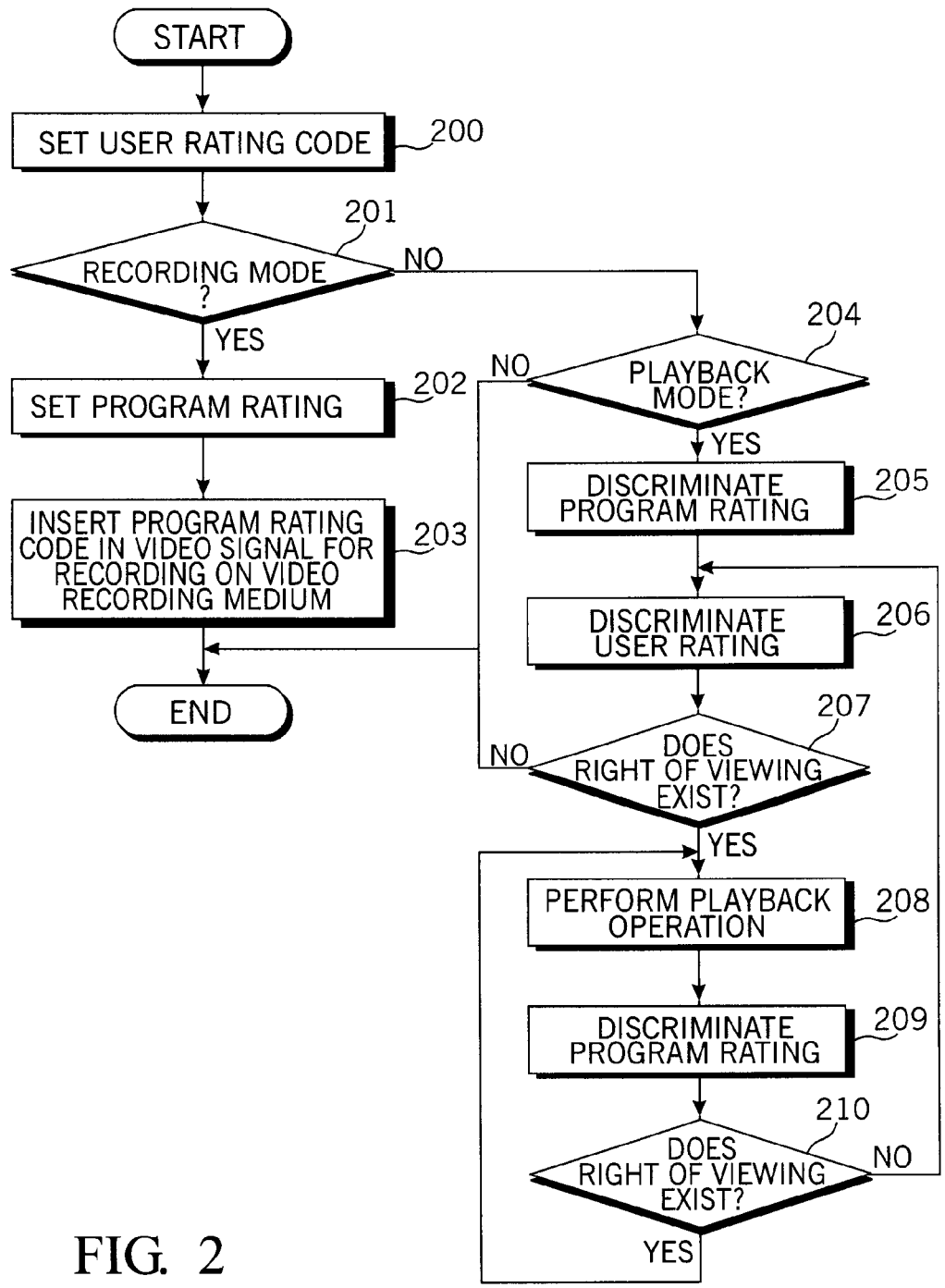
FIG. 2 is a flowchart of a process of recording and playing back a videogram based on a program rating of the videogram according to the principles of the present invention.

The operation of the video record/playback apparatus as shown in FIG. 1 will now be described in detail with reference to FIG. 2 hereinbelow.

If a user inputs a user rating code corresponding to user ratings via the key input unit 14, the controller 13b of the rating discriminator 13 stores the user rating code corresponding to the user key input of the user (i.e., a superintendent) in the storage unit 13c at step 200. As a result, the storage unit 13c stores the user rating code in correspondence with the user ratings. After the user rating codes have been stored in the storage unit 13c, the controller 13b determines whether an operational mode of the video record/playback apparatus as shown in FIG. 1 is in a recording mode at step 201. When the video record/playback apparatus is in the recording mode, the controller 13b controls the OSD 15 to display an image on a monitor so that the superintendent can set a program rating. If a key input signal of the superintendent is input via the key input unit 14 in order to set a program rating of the video signal to be recorded on a video recording medium at step 202, the controller 13b supplies the program rating code corresponding to the program rating set by the superintendent with key input unit 14 to the rating code insertion/separation unit 13a and the storage unit 13c. The storage unit 13c stores the program rating code supplied from the controller 13b and the rating code insertion/separation unit 13a inserts the program rating code supplied from the controller 13b into the video signal to then be output to the recording/ reproduction unit 12 and to the OSD 15 for recording on the video recording medium at step 203. In this situation, the rating code insertion/separation unit 13a inserts the program rating code into every video frame. The rating code insertion/separation unit 13a inserts the program rating code into a vertical blanking interval of the video signal in the case that the video recording medium 11 is a video tape, and inserts the program rating code into a user data interval in the case that the video recording medium is a DVD. The OSD 15 synthesizes the video signal input from the rating code insertion/separation unit 13a with the character signals representing various operational states of the video record/play apparatus as shown in FIG. 1 and outputs the synthesized result to the monitor for a visual display. The recording/reproduction unit 12 records the video signal augmented with the program rating code supplied from the rating code insertion/separation unit 13a on the video recording medium 11. As intended by the present invention, only a superintendent can set user rating codes corresponding to a single or plurality of user ratings and a program rating code of a videogram in the video record/playback apparatus as shown in FIG. 1. Security techniques for permitting the superintendent to set the user rating codes and the program rating code of a videogram are well-known to one skilled in the art, and therefore need not be described in detail in this application.

When the video record/playback apparatus as shown in FIG. 1 operates in a playback mode at step 204, the rating code insertion/separation unit 13a separates the program rating code from the signal supplied from the recording/reproduction unit 12 and outputs the result to the controller 13b. The controller 13b temporarily stops the operation of the recording/reproduction unit 12 and outputs the video signal for a visual display on the OSD 15. As a result, the monitor provides a visual display of an image of the video signal. The controller 13b compares the program rating code supplied from the rating code insertion/separation unit 13a with the program rating code stored in the storage unit 13c in order to determine the program rating of the video recording medium, and outputs the result of this determination to the OSD 15 at step 205. Then, the controller 13b controls the OSD 15 to display an image via the monitor so that the current user can input a user rating code. If a user rating code of the user is input via the key input unit 14, the input user rating code is compared with the user rating code(s) stored in the storage unit 13c, in order to determine the user rating at step 206. Sequentially, the controller 13b determines whether or not the current user has the right of viewing based on the discriminated program rating and user rating at step 207. In step 207, the controller 13b establishes the "existence of the right of viewing" if the user rating is higher than the program rating (for example, the program rating is for students of high school and the user rating is for adults) or the former is the same rating as the latter, to then perform a playback operation of step 208. Meanwhile, if the user rating is lower than the program rating, the controller 13b establishes "no right of viewing" to then complete all operations.

The controller 13b controls the recording/reproduction unit 12 and the rating code insertion/separation unit 13a in order to perform a playback operation with respect to the video recording medium, in the case that the current user has the right of viewing. The rating code insertion/separation unit 13a outputs the video signal input from the recording/reproduction unit 12 to the OSD 15, based on the control signal of the controller 13b at step 208. The controller 13b sequentially determines program rating in units of each video frame even during the time when the recording/reproduction unit 12 performs the playback operation at step 209. Then, the controller 13b compares the program rating determined with the user rating to then establish the existence of right of viewing at step 210. If the user has been discriminated to have the right of viewing in the result of discrimination, the operation of step 208 is performed and if not the operation of step 206 is preformed.

In an alternative embodiment of the present invention, instead of recording a program rating code together with a video signal, bar codes or color markings attached to a video recording medium for program rating indication are used. In other words, a program rating code is not separately recorded but markings attached on a video recording medium by a manufacturer of a videogram are used as a program rating code. In this case, the video record/playback apparatus according to the second embodiment of the present invention further includes a reader 16 which can read bar codes or color markings in addition to the above-described video record/playback apparatus as shown in FIG. 1. Meanwhile, the video record/playback apparatus of this embodiment does not require the rating code insertion/separation unit 13a. The output of the reader 16 is supplied to the controller 13b. However, the apparatus of this embodiment uses a user rating code in the same manner as that of the video record/playback apparatus as shown in FIG. 1. Thus, since the operation of this embodiment is apparent to one having an ordinary skill in the art who understands the description of the video record/playback apparatus as shown in FIG. 1, the detailed description thereof will be omitted.

As described above, the video record/playback apparatus and method according to the principles of the present invention effectively restricts access to a videogram contained in a video recording medium, based on a program rating of the videogram contained in the video recording medium and a user rating of the current user.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof Therefore, it is intended that the present invention not be limited to the particular embodiment disclosed as the best mode contemplated for carrying out the present invention, but that the present invention includes all embodiments falling within the scope of the appended claims.

What is claimed is:

1. A process of restricting playback of a video recording medium containing a videogram, said video recording medium being a video cassette tape (VCT) or digital versatile disc (DVD), said videogram having a plurality of frames, said process comprising the steps of:

in response to a manual indication of a program rating code input by a user, recording a program rating code indicating a program rating for a videogram in an interval of the recording medium accommodating storage of a video signal for additional information about a VCT or a DVD;

storing from among a plurality of user rating codes at least one user rating code corresponding to a user rating determined by a superintendent;

making a first comparison between said program rating code recorded on the video recording medium and one of said user rating codes defining a class of viewers of the videogram and another of said user rating codes representing a current viewer of the videogram;

making a frame-by-frame comparison between said program rating code recorded on the video recording medium and a different one of said user rating codes defining a class of viewers of the videogram and another of said user rating codes representing a current viewer of the videogram; and performing a playback operation of the video recording medium in accordance with the comparison for each video frame of the videogram by allowing or suppressing video display of said videogram on a frame-by-frame basis.

2. An apparatus for restricting playback of a video recording medium containing a videogram, said videogram having a plurality of frames, said video recording medium being a video cassette tape (VCT) or a digital versatile disc (DVD), said apparatus comprising:

a key input unit enabling a user to input user rating codes and to input a program rating code for the videogram;

a recording/reproduction unit for recording the input program rating code on the video recording medium and reproducing a video signal reflective of the videogram recorded on the video recording medium;

a rating code insertion/separation unit for inserting the program rating code into the videogram to be recorded on the video recording medium and separating the program rating code from the video signal supplied from the recording/reproduction unit, said rating code insertion/separation unit adapted for storing said program rating code in a vertical blanking interval of a video signal of a VCT or in a user data interval of a DVD;

a memory storing the user rating codes; and a controller regulating access to viewing of videograms reproduced by said apparatus on a basis of a first comparison between said program rating code and one of said user rating codes defining a class of viewers of videograms reproduced by said apparatus and another of said user rating codes representing a current viewer of videograms reproduced by said apparatus, and a second comparison between the program rating code a different one of said user rating codes defining said class of viewers and said user rating codes representing said current viewer.

3. An apparatus for restricting playback of a video recording medium containing a videogram, said videogram having a plurality of frames, said apparatus comprising:

a video recording medium bearing a program rating code indicative of a videogram carried by the medium;

a reader for reading the program rating code indicated on the video recording medium;

a key input unit enabling a supervisor of said apparatus to input at least one user rating code defining a class of viewers of videograms reproduced by said apparatus, and enabling a user of said apparatus to input a user rating code representing a current viewer of videograms reproduced by said apparatus;

a reproducing unit for reproducing a video signal corresponding to the videogram from the video recording medium;

a storage unit for storing the input at least one user rating code; and means for indicating and storing the program rating code, for each frame; and a controller regulating access to viewing of videograms reproduced by said apparatus on a basis of a comparison between said at least one user rating code and said user rating code representing a current viewer, and controlling reproduction of the videogram by allowing or suppressing said reproduction of the videogram by comparing the program rating code and the at least one user rating code, for each frame of the videogram on a frame-by-frame basis.

4. An apparatus for restricting playback of a video recording medium containing a videogram, said medium having associated therewith a program rating code for the videogram, said apparatus comprising:

a stage indicating a program rating code associated with one of a video signal representing the videogram or the video recording medium;

a key input unit enabling a supervisor of said apparatus to input at least one user rating code defining a class of viewers of videograms reproduced by said apparatus, and enabling a user of said apparatus to input a user rating code representing a current viewer of videograms reproduced by said apparatus;

a reproducing unit for reproducing a video signal reflective of the videogram from the video recording medium;

a memory storing said input of at least one user rating code; and a controller making a first comparison of said at least one user rating code and said user rating code representing a current viewer, and making a second comparison of said program rating code received from the reader with the at least one user rating code stored in said memory and controlling the reproducing unit to perform a playback operation of the video recording medium according to the first and second comparisons.

5. The apparatus of claim 4, wherein said program rating code is a barcode and said stage is a barcode reader.

* * * * *